April 18, 1933.   E. W. LARSEN   1,904,869
INDICATING AND CONTROL DEVICE FOR MATERIAL RECEIVING APPARATUS
Filed Aug. 17, 1929   2 Sheets-Sheet 1
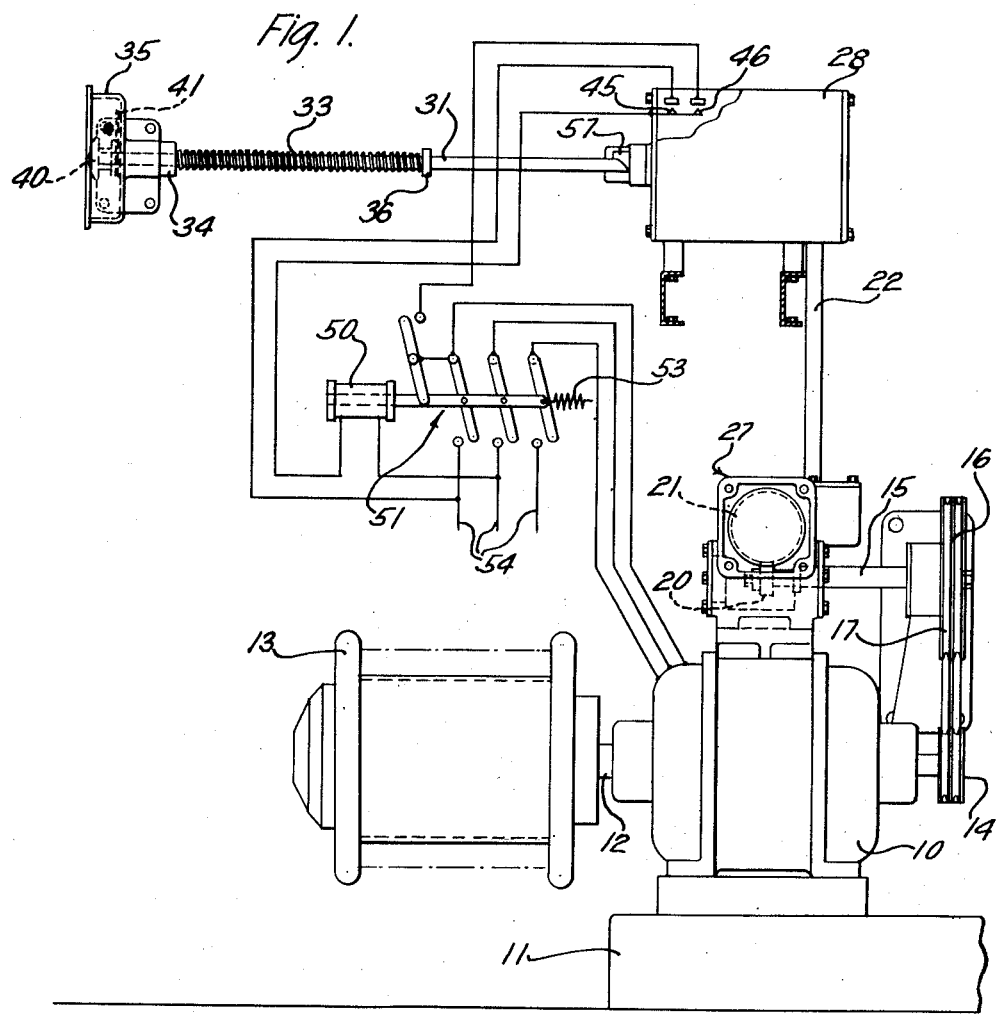
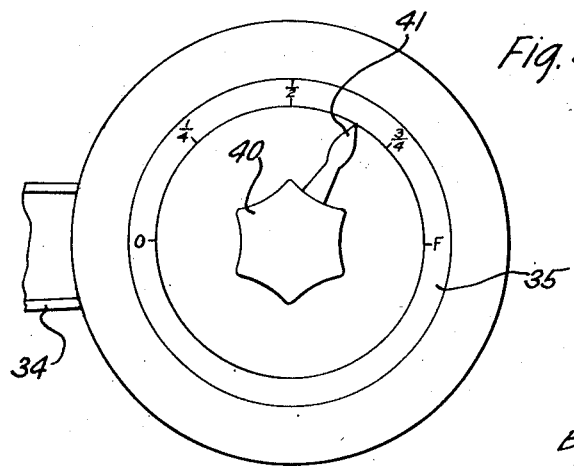
Inventor
Einer W. Larsen
By H. A. Pattison Att'y.

April 18, 1933.                    E. W. LARSEN                    1,904,869
                INDICATING AND CONTROL DEVICE FOR MATERIAL RECEIVING APPARATUS
                    Filed Aug. 17, 1929            2 Sheets-Sheet 2
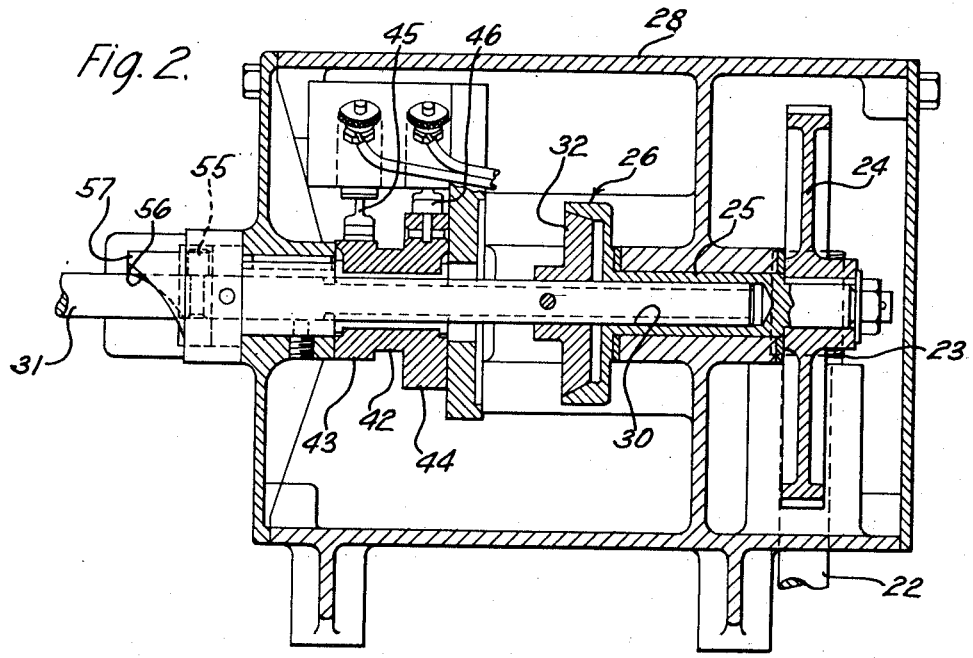
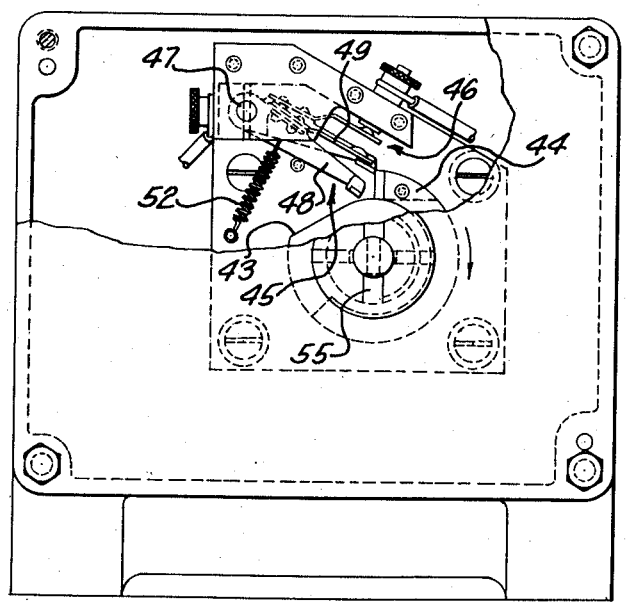
Inventor
Einer W. Larsen
By H. A. Pattison Att'y Patented Apr. 18, 1933

1,904,869

UNITED STATES PATENT OFFICE

EINER W. LARSEN, OF CHICAGO, ILLINOIS, ASSIGNOR TO WESTERN ELECTRIC COMPANY, INCORPORATED, OF NEW YORK, N. Y., A CORPORATION OF NEW YORK

INDICATING AND CONTROL DEVICE FOR MATERIAL RECEIVING APPARATUS

Application filed August 17, 1929. Serial No. 386,561.

This invention relates to indicating and control devices for material receiving apparatus, particularly for use with a strand reeling apparatus.

The primary object of the invention is the provision of a simple and efficient apparatus for indicating the amount of material accumulated in a material receiving apparatus and for controlling the actuation thereof.

One embodiment of the invention contemplates an indicating and control apparatus for the take-up portion of a wire drawing machine, in which an indicator pointer is operated from the take-up arbor of a wire drawing machine through gearing and a clutch to indicate on a dial during the operation the amount of wire accumulated on the take-up reel and to open the power circuit and stop the operating motor when the reel has wound thereon a predetermined amount of wire. To re-start the motor the pointer may be pulled outwardly to disconnect the clutch and the pointer reset to a zero indication, during which operation the power circuit is re-established.

It is believed that the invention will be clearly understood from the following detailed description and the accompanying drawings, in which Fig. 1 is a fragmentary elevational view of a strand winding apparatus having connected thereto an indicating and control device embodying features of the invention;

Fig. 2 is an enlarged longitudinal sectional view taken medially of the indicating and control device shown in Fig. 1;

Fig. 3 is an enlarged end view thereof with a portion of the cover broken away to show better the electrical contacts, and Fig. 4 is an enlarged elevational view of the dial and indicator pointer of the indicating and control device.

Referring now to the drawings wherein like reference numerals designate similar parts throughout the several views, an electric motor 10 (Fig. 1) secured to a base 11 has rigidly mounted in any suitable manner, on its driving shaft 12 a removable take-up reel 13 for receiving and winding a wire thereon as it is delivered thereto from any conventional type of wire drawing machine. The driving shaft 12 extends beyond the rear end of the motor housing and has secured thereto a pulley 14 which actuates a horizontal shaft 15 through a pulley 16 and a rope drive 17. On the left hand end of the shaft 15 is fastened a worm 20 meshing with a worm wheel 21 of a speed reducer 27 of any suitable type, which drives a vertical shaft 22 through suitable gearing (not shown). The upper end of the shaft 22 (Fig. 2) carries a worm 23 which meshes with a worm wheel 24 keyed to a driving member 25 of a clutch 26 suitably mounted within a casing 28. Rotatably and slidably positioned within a bore 30 of the driving member 25 is an elongated horizontal shaft 31 which has secured to it a disc 32 held in engagement with the driving member 25 of the clutch by a coil spring 33 (Fig. 1) surrounding the shaft 31 and having one end abutting a collar 36 fastened thereto. The other end of the spring abuts the shoulder of a bracket 34 having integral therewith a dial 35 and in which the left hand portion of the shaft 31 is journaled. The left hand end of this shaft carries a knob 40 (Figs. 1 and 4) and a pointer 41 for indicating the amount of wire accumulating on the take-up reel 13 when the motor 10 is in operation. Although the dial 35 is shown calibrated in quarter fractions of a full spool, it will be understood that the dial may be conveniently calibrated in pounds and that the gear ratios of the drive would be changed according to the size of the take-up reel being used and the size of the wire being wound.

The operation of the motor is controlled by a cam 42 slidably keyed to the shaft 31 within the casing 28 (Fig. 2) and having two camming portions 43—44 for operating electrical switches 45—46 pivoted on a stud 47 secured to the casing. Each of the switches comprises a lever 48 for engaging the cam and a spring contact 49 fastened on the top of the lever for opening and closing an energizing circuit to a solenoid 50 (Fig. 1) controlling a switch 51 for connecting the motor to a power line 54.

When the take-up reel becomes filled with wire, the pointer has rotated through 180° and indicates a full reel and portion 44 of the cam 42 has rotated just past the position shown in Fig. 3 whereupon the energy stored in a spring 52 (Fig. 3) pulls the switch 46 downward to discontinue the energizing circuit for the solenoid 50 and a spring 53 thereupon opens the switch 51 to disconnect the motor from the power line.

To restart the winding operation after replacing the full take-up reel by an empty one, the operator grasps the knob 40 and pulls the shaft 31 outwardly against the compressive force of the spring 33 to disconnect the clutch 26 and turns the knob clockwise through approximately 100° and releases it. This longitudinal and rotational movement of the shaft 31 brings a pin 55 (Figs. 2 and 3) secured thereto into sliding engagement with an inclined surface 56 of a stationary cam 57 fastened to the casing 28 and the energy stored in the coil spring 33 forces the pin to follow the inclined surface of the stationary cam to return the pointer to a zero indication, rotate the cam 42 to establish an energizing circuit for the solenoid 50, and operate the clutch 26.

As the cam 42 rotates due to the compressive force of the spring 33, the cam portions 43—44 move the electrical switches 45—46 upwardly to establish an energizing circuit for the solenoid. The energization of the solenoid moves the switch 51 against the tension of the spring 53 and connects the motor to the power line 54. The closing of the switch 51 establishes a locking circuit for the solenoid through the switches 51 and 46 and subsequent thereto the cam portion 43 rotates out of engagement with the switch 45 and releases it.

The motor drives the take-up reel to wind the wire thereon as it is fed from the wire drawing machine (not shown) and at the same time the shaft 31 and the indicator pointer 41 carried thereby are driven by the motor through the rope drive 17, speed reducer 27, vertical shaft 22, and clutch 26 as hereinbefore described. As the wire stored on the take-up reel increases, the pointer 41 continually indicates on the dial 35 the amount thereof. When the take-up reel has wound thereon a predetermined amount of wire, the cam portion 44 rotates out of engagement with the switch 46 and the spring 52 connected thereto moves it to open the energizing circuit of the solenoid whereby the spring 53 opens the switch 51 to disconnect automatically the motor from the power line. The full reel is then replaced by an empty one and the motor re-started by manually re-setting the indicator pointer to a zero indication as has been fully described.

In winding wire of different gauges the worm 23 and worm wheel 24 are replaced by similar members of different sizes depending on the particular gauge wire being wound so that the pointer will indicate correctly on the dial the amount of wire stored.

Although the invention as herein described and illustrated is particularly well adapted for use with wire drawing machines, it will be understood that the invention is capable of many other modifications and applications without departing from the scope of the invention as defined by the appended claims.

What is claimed is:

1. In a material receiving apparatus, means for receiving material, means for actuating the receiving means, means for continually indicating the amount of material received by the receiving means, and means for automatically rendering the actuating means effective upon the resetting of the indicating means to a zero indication.

2. In a material receiving apparatus, means for receiving material, an electric motor for actuating the receiving means, an electromagnetic means for connecting the motor to a source of electrical power, means for disconnecting the motor when a predetermined amount of material is received by the receiving means, an indicating means, and means for operating the electromagnetic means during the resetting of the indicating means to a zero indication.

3. In a strand winding apparatus, means for receiving a strand, means for actuating the receiving means, means operatively associated with the receiving means for continually indicating the amount of strand received, and means responsive to the resetting of the indicating means and to the predetermined actuation of the receiving means for controlling the starting and stopping of the actuating means.

4. In a strand winding apparatus, a take-up reel, an electric motor for rotating the take-up reel, means actuated by the motor for continually indicating the amount of strand wound on the take-up reel, and means controlled by the indicating means being responsive to a zero setting thereof for an empty take-up reel for automatically connecting the motor to a source of electric power and automatically disconnecting the motor therefrom upon a predetermined condition produced in the indicating means by the fullness of the take-up spool.

5. In a strand winding apparatus, means for receiving a strand, means for actuating the receiving means, means for indicating the fullness of the receiving means, and means for automatically rendering the actuating means ineffective when the receiving means is of a predetermined fullness and for automatically rendering the actuating means effective upon the resetting of the indicating means to a zero indication.

6. In a material receiving apparatus, means for receiving material, means for actuating the receiving means, means operatively associated with the receiving means for indicating the fullness of the receiving means as material is received thereby, and means actuated by predetermined conditions of the indicating means for automatically controlling the operation of the receiving means, the conditions of the indicating means being produced by a zero setting thereof and by a predetermined actuation of the receiving means in being loaded to fullness.

In witness whereof, I hereunto subscribe my name this 7 day of August A. D., 1929.

EINER W. LARSEN.